(12) United States Patent
Jang et al.

(10) Patent No.: US 8,674,579 B2
(45) Date of Patent: Mar. 18, 2014

(54) STATOR CORE OF MOTOR FOR WASHING MACHINE

(75) Inventors: Jung Cheol Jang, Gwangju (KR); Gyeong Sik Yang, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 19 days.

(21) Appl. No.: 13/365,464

(22) Filed: Feb. 3, 2012

(65) Prior Publication Data
US 2013/0169104 A1  Jul. 4, 2013

(30) Foreign Application Priority Data
Jan. 2, 2012  (KR) .................. 10-2012-0000126

(51) Int. Cl.
*H02K 1/06* (2006.01)

(52) U.S. Cl.
USPC ...... 310/216.008; 310/216.009; 310/216.013; 310/216.043

(58) Field of Classification Search
USPC .................. 310/216.008, 216.007, 216.009, 310/216.013, 216.041, 216.043, 216.044, 310/216.137
See application file for complete search history.

(56) References Cited

U.S. PATENT DOCUMENTS

| | | | |
|---|---|---|---|
| 6,993,822 B2 | 2/2006 | Park et al. | |
| 7,336,014 B2 | 2/2008 | Lee | |
| 2005/0125989 A1 | 6/2005 | Lee et al. | |

FOREIGN PATENT DOCUMENTS

| | | | |
|---|---|---|---|
| JP | 2006-288096 A | | 10/2006 |
| JP | 2010193715 A | * | 9/2010 |
| JP | 2010233374 A | * | 10/2010 |
| JP | 2011072058 A | * | 4/2011 |
| KR | 10-2004-0032643 A | | 4/2004 |
| KR | 10-2005-0056680 A | | 6/2005 |
| KR | 10-2005-0088799 A | | 9/2005 |
| KR | 10-2007-0038781 A | | 4/2007 |
| KR | 100969699 | * | 4/2007 |
| KR | 10-2009-0130274 A | | 12/2009 |

OTHER PUBLICATIONS

Machine Translation JP2010233374 (2010) JP2011072058 (2011) and JP2010193715 (2010).*

* cited by examiner

*Primary Examiner* — Tran Nguyen
*Assistant Examiner* — Jose Gonzalez Quinones
(74) *Attorney, Agent, or Firm* — Sherr & Jiang, PLLC (57) ABSTRACT

The present invention relates to a stator core of a motor for a washing machine that is formed by connecting a plurality of arc-shaped core pieces to each other, each of the core pieces being formed by stacking core piece steel plates on top of each other and by bending the stacked core piece steel plates in such a manner that core piece teeth are disposed outward in the radial direction of a core piece yoke and the core piece yoke has the same curvature as a yoke of a stator core, the core piece yoke on each core piece steel plate having a plurality of incised portions for bending formed partially incised thereon between the respective neighboring core piece teeth on the opposite side to the side on which the core piece teeth are formed.

5 Claims, 7 Drawing Sheets

STATOR CORE OF MOTOR FOR WASHING MACHINE

CROSS REFERENCE TO PRIOR APPLICATIONS

The present application claims priority under 35 U.S.C. §119 to Korean Patent Application No. 10-2012-0000126 (filed on Jan. 2, 2012), which is hereby incorporated by reference in its entirety.

BACKGROUND OF THE INVENTION

1. Field of the Invention

The present invention relates to a stator core of a motor for a washing machine and a method for manufacturing the same, and more particularly, to a stator core of a motor for a washing machine and a method for manufacturing the same that is newly configured to constitute a stator connecting a washing shaft or dehydration shaft of the washing machine to an output shaft of a rotor, thereby reducing its material cost and achieving easy machining and assembly.

2. Background of the Related Art

Generally, a washing machine receives the power from a driving motor disposed in or under a washing machine tub to rotate the washing machine tub. The power from the driving motor of the washing machine is transmitted by indirectly connecting the output shaft of the driving motor to the driving shaft of the washing machine tub via a belt or by directly connecting the output shaft of the driving motor thereto. So as to reduce noise, failures and energy consumption, to improve the whole strength of the rotor, and further to enhance the washing capability, recently, the outer rotor of the motor is connected directly to the washing machine tub, which is very widely adopted.

Generally, the motor for the washing machine largely consists of a stator and a rotor disposed rotatably on the outer periphery of the stator. The stator of the motor for the washing machine has a stator core having a yoke formed in the shape of an annular band having a given curvature and a plurality of teeth protruded outward from the outer periphery of the yoke in the radial direction of the yoke and arranged at predetermined intervals in the circumferential direction of the yoke through the formation of slots between the neighboring teeth. A coil is wound along each tooth of the stator core.

Typically, the stator core is made by blanking a steel plate and stacking the blanked core steel plates each having the annular yoke and the teeth protruded radially from the outer periphery of the yoke on top of each other. By the way, since the steel plate for the stator core basically has the annular shape, the portion inside the yoke and the portions between the teeth should be thrown away as scrap metals at the time of the blanking of the steel plate.

Furthermore, in case where the plurality of steel plates are stacked to manufacture the stator core, they are pressed and fixed to each other by means of caulking, but in this case, the respective plates are open relative to each other or cracked thereon, thereby undesirably generating noise or vibration during operation.

SUMMARY OF THE INVENTION

Accordingly, the present invention has been made in view of the above-mentioned problems occurring in the prior art, and it is an object of the present invention to provide a stator core of a motor for a washing machine and a method for manufacturing the same wherein core piece steel plates adapted to be bent and connected annularly to each other in a stacking state to form the stator core are blanked in a linear shape from a steel plate, thereby preventing the unnecessary consumption of the material thereof.

It is another object of the present invention to provide a stator core of a motor for a washing machine and a method for manufacturing the same wherein since core piece steel plates have a linear shape, they are arranged and blanked in two rows in such a manner that a plurality of teeth on one row are engaged with slots on the other row, thereby minimizing the consumption of the material and enhancing the efficiency of the blanking machining.

It is still another object of the present invention to provide a stator core of a motor for a washing machine and a method for manufacturing the same wherein incised portions for bending are formed on core piece steel plates so as to reduce the bending force on the core piece steel plates being bent in the stacking state and to ensure an accurate curvature through the bending, thereby achieving easy manufacturing.

It is yet another object of the present invention to provide a stator core of a motor for a washing machine and a method for manufacturing the same wherein pole portions are formed on the ends of a plurality of teeth being open at their intervals by means of bending in the state of being stacked, and each pole portion has a relatively large width, thereby minimizing the intervals between the neighboring slots acting as a cause of cogging.

It is yet still another object of the present invention to provide a stator core of a motor for a washing machine and a method for manufacturing the same wherein incised portions for bending are formed and coated with an adhesive, thereby preventing core piece steel plates from being open relative to each other or cracked thereon and further keeping noise and vibration from being generated during the operation of the motor.

To accomplish the above objects, according to an aspect of the present invention, there is provided a stator core of a motor for a washing machine, the stator core having a yoke formed in the shape of an annular band having a given curvature and a plurality of teeth protruded outward from the outer periphery of the yoke in the radial direction of the yoke and arranged at predetermined intervals in the circumferential direction of the yoke through the formation of slots between the neighboring teeth, wherein the stator core is formed by connecting a plurality of arc-shaped core pieces to each other, each core piece being formed by stacking core piece steel plates on top of each other, each core piece steel plate having a core piece yoke formed in the shape of a linear band, a plurality of core piece teeth protruded from one side of the core piece yoke in a width direction and arranged at predetermined intervals in the longitudinal direction of the core piece yoke by the formation of slots between the neighboring core piece teeth, and a coupling groove and a coupling protrusion formed on both side ends of the core piece yoke in the longitudinal direction of the core piece yoke in such a manner as to be engaged with the coupling protrusion and coupling groove of the neighboring core pieces, and by bending the stacked core piece steel plates in such a manner that the core piece teeth are disposed outward in the radial direction and the core piece yoke has the same curvature as the yoke of the stator core.

According to the present invention, desirably, the core piece yoke on each core piece steel plate having a plurality of incised portions for bending formed partially incised thereon between the respective neighboring core piece teeth on the opposite side to the side on which the core piece teeth are formed, each incised portion for bending being formed in such a manner that the incised faces are brought partially into contact with each other in the state where the respective core pieces are bent to have the curvature of the yoke of the stator core.

According to the present invention, desirably, the core piece teeth of the core piece steel plates have pole portions formed on the ends thereof, each pole portion being protrudedly extended to a given length toward both sides of each core piece tooth in the width directions of the core piece teeth.

According to the present invention, desirably, each of gaps between the respective neighboring pole portions is formed equal to a width of each core piece tooth.

According to the present invention, desirably, each incised portion for bending has the inner sides along which an adhesive is applied.

To accomplish the above objects, according to another aspect of the present invention, there is provided a method for manufacturing a stator core of a motor for a washing machine, the method including the steps of: blanking from a steel plate material core piece steel plates each having a core piece yoke formed in the shape of a linear band, a plurality of core piece teeth protruded from one side of the core piece yoke in a width direction and arranged at predetermined intervals in the longitudinal direction of the core piece yoke through the formation of slots between the neighboring core piece teeth, and a coupling groove and a coupling protrusion formed on both side core piece yoke ends in the longitudinal direction of the core piece yoke in such a manner as to be engaged with the coupling protrusion and coupling groove of the neighboring core piece yokes; stacking the blanked core piece steel plates on top of each other; bending the core piece steel plates in such a manner that the core piece teeth are disposed outward in the radial direction and the core piece yoke has the same curvature as the yoke of the stator core in the state where the core piece steel plates are stacked on top of each other, thereby forming core pieces; connecting the core pieces to an annular shape and performing plastic deformation and caulking on the connected portions of the core pieces; and applying an adhesive to incised portions for bending formed on the core piece yoke between the respective neighboring core piece teeth on the opposite side to the side on which the core piece teeth are formed.

According to the present invention, desirably, the step of blanking the core piece steel plates is carried out in a state where the core piece teeth of one core piece steel plate are located into the core piece slots of the other core piece steel plate.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a stator core of a motor for a washing machine and a method for manufacturing the same according to the present invention will be in detail given with reference to the attached drawing.

Figure 1:
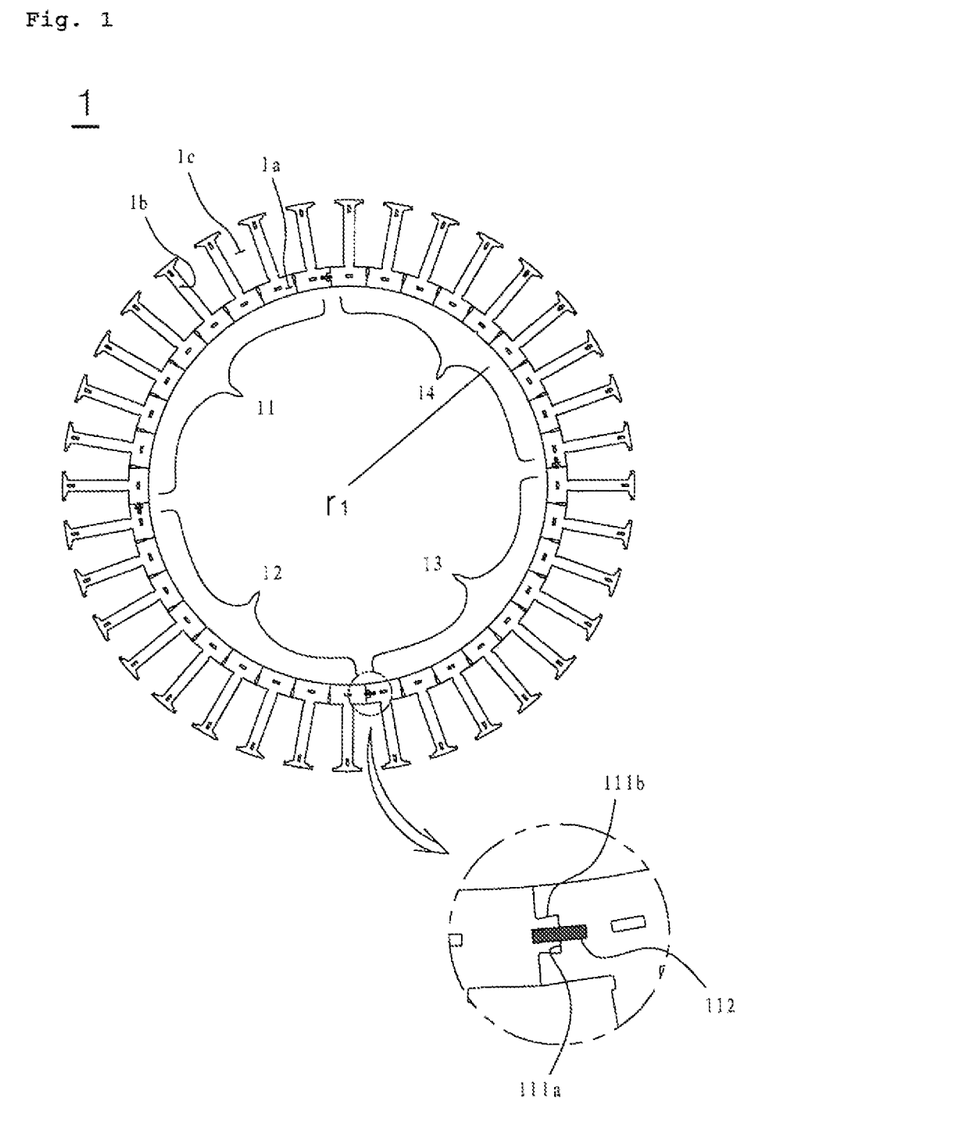
FIG. 1 is a plane view showing a stator core of a motor for a washing machine according to the present invention.

FIG. 1 is a plane view showing a stator core of a motor for a washing machine according to the present invention.

As shown in FIG. 1, a stator core 1 of a motor according to the present invention largely includes a yoke 1$a$ formed in the shape of an annular band having a given curvature and a plurality of teeth 1$b$ protruded outward from the outer periphery of the yoke 1$a$ in the radial direction of the yoke 1$a$ and arranged at predetermined intervals in the circumferential direction of the yoke 1$a$ through the formation of slots 1$c$ between the neighboring teeth 1$b$. According to the present invention, the generally annular stator core 1 having the yoke 1$a$, the teeth 1$b$ and the slots 1$c$ is formed by connecting four core pieces 11 to 14 to each other in an annular shape.

Figure 2:
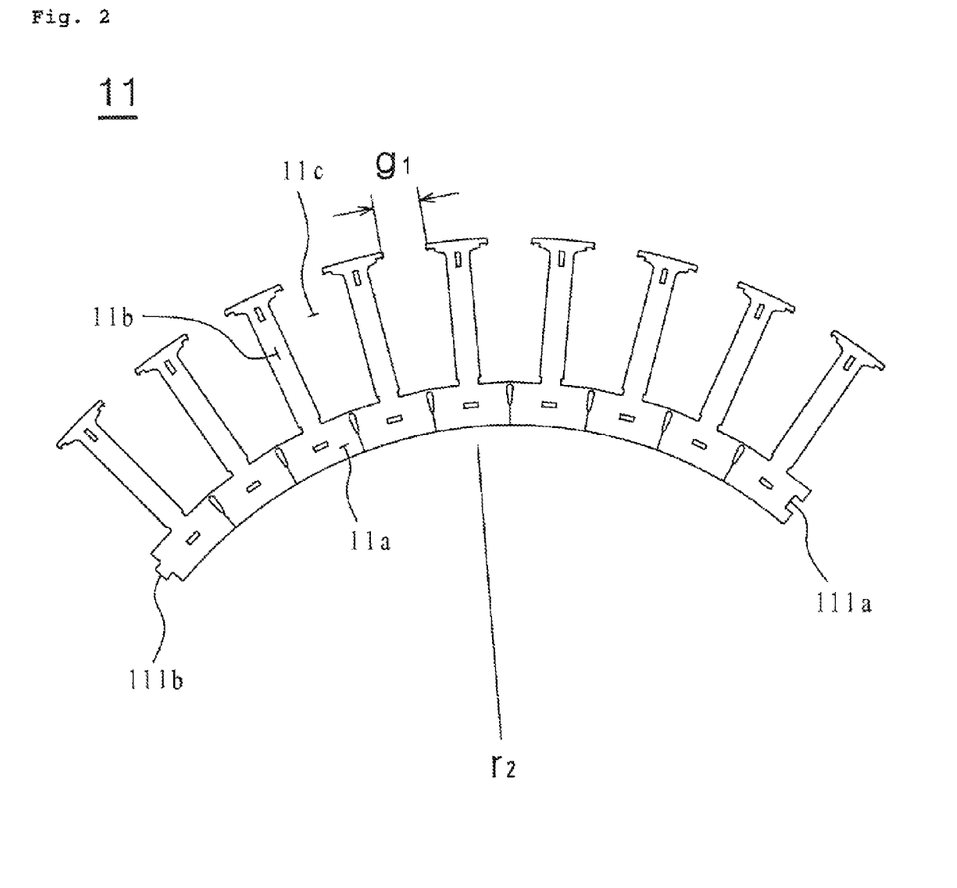
FIG. 2 is a plane view showing one core piece of the stator core of a motor for a washing machine according to the present invention.

FIG. 2 is a plane view showing one core piece 11 of the four core pieces constituting the stator core 1 of a motor for a washing machine according to the present invention.

Referring to FIGS. 1 and 2, the core piece 11 is formed in an arc-like shape bent to a curvature r2 that is the same as a curvature r1 of the stator core 1, and has a core piece yoke 11$a$, a core piece teeth 11$b$ and core piece slots 11$c$ formed correspondingly to the yoke 1$a$, the teeth 1$b$ and the slots 1$c$ of the stator core 1. The core piece yoke 11$a$ of the core piece 11 has a coupling groove 111$a$ and a coupling protrusion 111$b$ formed on both side ends thereof in the circumferential direction thereof in such a manner as to be engaged with the coupling groove and the coupling protrusion formed on the core piece yoke ends of another core pieces 12 and 14. The plurality of core pieces 11 to 14 are arranged annularly together, and in this state, their coupling protrusions are inserted into the coupling grooves adjacent thereto, thereby conducting their coupling. On the other hand, referring to FIG. 1, the core piece yokes of the annularly coupled core pieces 11 to 14 are subjected to plastic deformation on the connected portion of the ends thereof, thereby forming coking portions 112 that reinforce the coupling. The core pieces 11 to 14 are formed by stacking a plurality of core piece steel plates 20 and 20' on top of each other and by bending the stacked steel plates.

Figure 3:
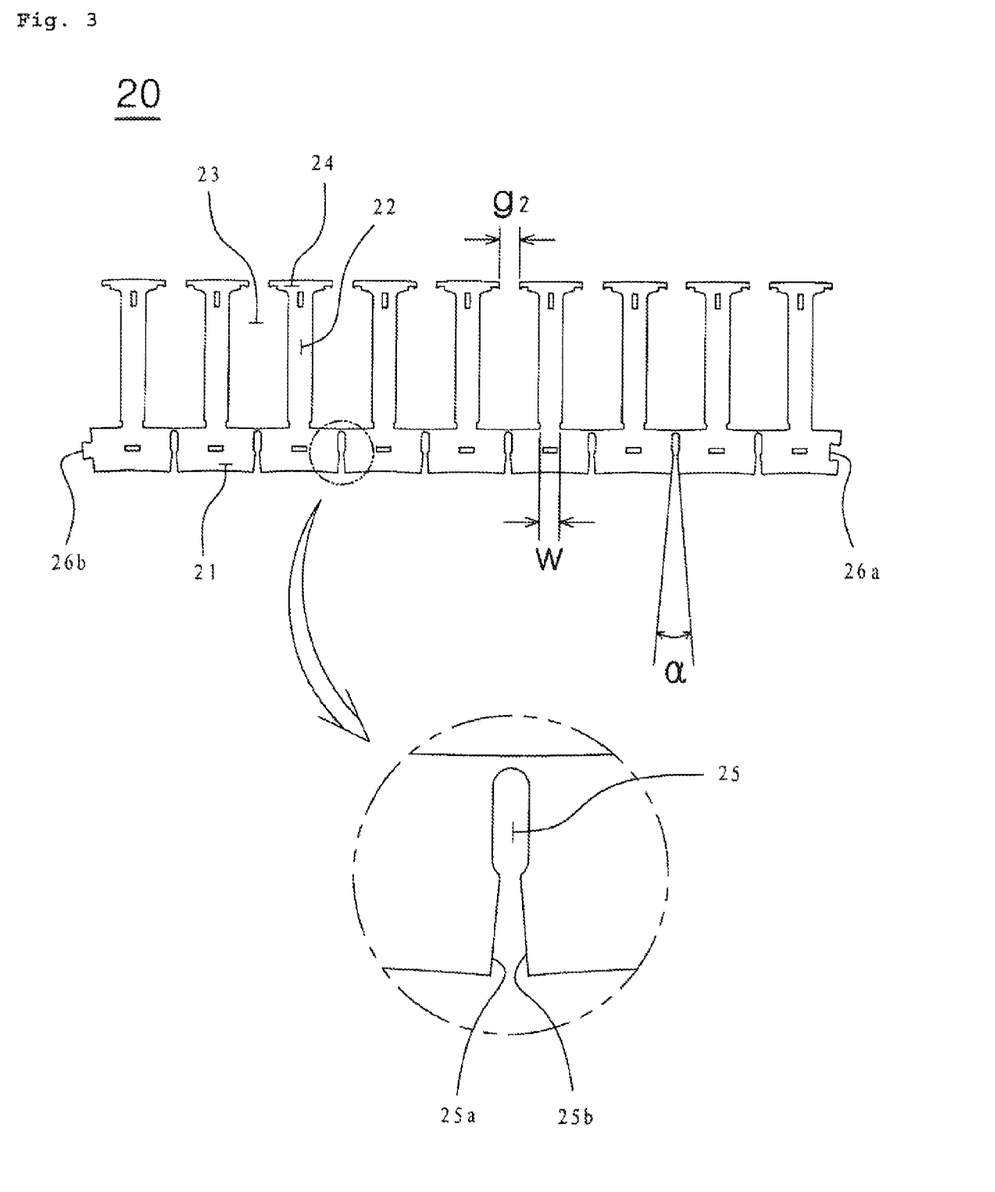
FIG. 3 is a plane view showing a core piece steel plate constituting the core piece of the stator core of a motor for a washing machine according to the present invention.

FIG. 3 is a plane view showing a core piece steel plate 20 constituting the core piece 11 of the stator core of a motor for a washing machine according to the present invention.

Referring to FIG. 3, the core piece steel plate 20 includes a core piece yoke 21 formed in the shape of a linear band, a plurality of core piece teeth 22 protruded outward from one side of the core piece yoke 21 in the radial direction of the core piece yoke 21 and arranged at predetermined intervals in the longitudinal direction of the core piece yoke 21 through the formation of core piece slots 23 between the neighboring core piece teeth 22, and a coupling groove 26a and a coupling protrusion 26b formed on both side core piece yoke ends in the longitudinal direction of the core piece yoke 21 in such a manner as to be engaged with the coupling protrusion and coupling groove of the adjacent core piece yokes thereto. According to the present invention, as mentioned above, the core piece steel plate 20 is blanked in a linear shape, thereby minimizing the unnecessary loss of the material.

The respective core pieces 11 to 14 are formed by stacking the core piece steel plates 20 on top of each other and by bending the stacked core piece steel plates 20 in such a manner as to allow the core piece teeth 22 to be located outward in the radial direction and to allow the curvature r2 of the core piece yoke 21 to become the curvature r1 of the yoke 1a of the stator core 1.

On the other hand, in the state where the core piece steel plates 20a are stacked on top of each other, bending them needs a substantially large force. Besides, the bending should be carried out in such a manner as to have the curvature r1 of the yoke 1 of the stator core 1.

So as to reduce the bending force in the bending process and to achieve the bending process of the core piece steel plates 20 at an accurate curvature, accordingly, the yoke 21 has incised portions 25 for bending formed thereon.

Referring to FIG. 3, the incised portions 25 for bending are formed incised partially between the respective neighboring core piece teeth 22 on the opposite side of the core piece yoke 21 of the core piece steel plate 20 to the side where the core piece teeth 22 are formed. In the state where the core piece steel plates 20 on which the incised portions 25 for bending are formed are stacked on top of each other, they are bent to have the curvature r1 of the yoke 1a of the stator core 1, thereby forming the core pieces 11 to 14. In the state where the stacked core piece steel plates 20 are bent to have the curvature r1 of the yoke 1a of the stator core 1, especially, so as to prevent the bending from being further developed, each incised portion 25 for bending is formed in such a manner that the incised faces are brought partially into contact with each other. That is, each incised portion 25 for bending has contacted portions 25a and 25b formed along the positions facing each other, and the contacted portions 25a and 25b become near in the process where the core piece yokes 21 of the stacked core piece steel plates 20 are bent. Finally, they are brought into contact with each other in the state where the stacked core piece steel plates 20 are bent to have the curvature r1 of the yoke 1a of the stator core 1.

Accordingly, the core piece yokes 21 of the stacked core piece steel plates 20 are bent to the positions where the contacted portions 25a and 25b are contacted with each other, thereby having the curvature r1 of the yoke 1a of the stator core 1. The contacted portions 25a and 25b are desirably contacted through face contacting, not through point contacting, and further, they are formed symmetrically to each other. Accordingly, the contacted portions 25a and 25b have an angle α formed therebetween, which is calculated by the curvature r1 of the stator core 1 and the number of teeth 1b.

On the other hand, the stator core 1 is formed by connecting the core pieces 11 to 14 made by stacking the core piece steel plates 20 blanked in the linear shape on top of each other and by bending them. By the way, since the motor of the present invention as shown in the drawings is the outer rotor type of motor, the teeth 1b of the stator core 1 are located radially on the outside. Accordingly, in the process where the stacked core piece steel plates 20 are bent, gaps g2 between the respective neighboring core piece teeth 22 forming the teeth 1b of the stator core 1 become gradually open. The gaps g1 between the respective neighboring teeth 1b of the stator core 1 cause the cogging of the motor. Accordingly, it is desirable that the gaps g1 between the respective neighboring teeth 1b of the stator core 1 should be small. According to the present invention, therefore, the gaps g2 between the respective neighboring ends of the core piece teeth 22 of the core piece steel plates 20 are formed with a substantially very small size. That is, the ends of the core piece teeth 22 of the core piece steel plates 20 have pole portions 24 extended protrudedly from both sides thereof by a given length in the width directions of the core piece teeth 22.

According to the present invention, on the other hand, the core piece steel plates 20 are blanked in the linear shape, thereby minimizing the unnecessary loss of the material. However, the portions where the core piece slots 23 are formed between the core piece teeth 22 of the core piece steel plates 20 are still left over as scraps. Accordingly, the present invention solves the above-mentioned problem by at the same time blanking the two core piece steel plates 20 and 20' arranged side by side in the state where the respective core piece teeth 22 and 22' are engaged with each other.

Figure 4:
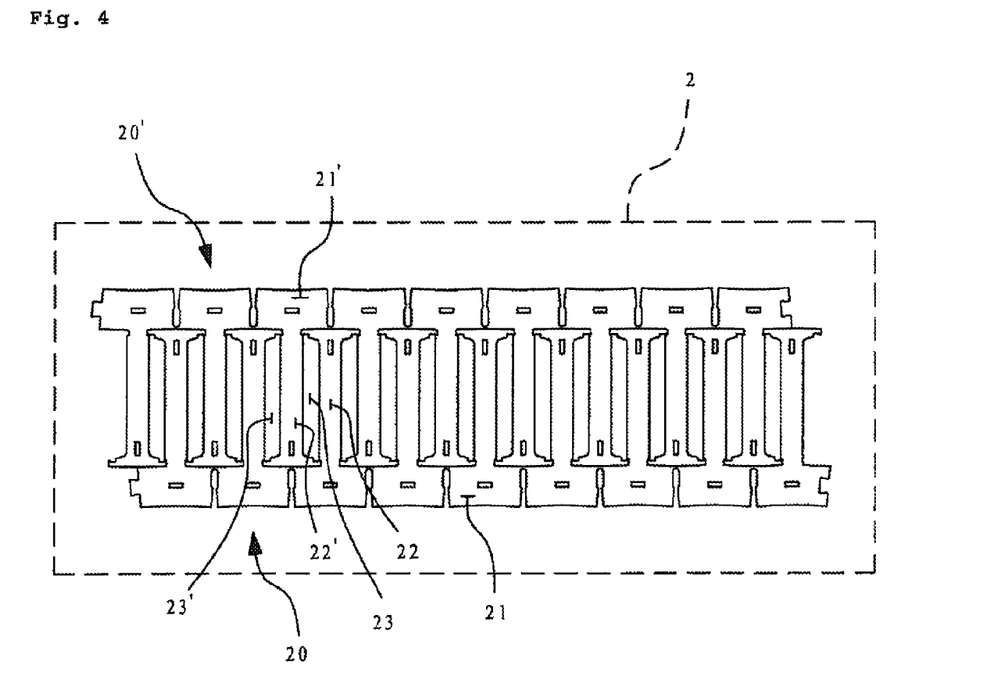
FIG. 4 is a plane view showing a state where the core piece steel plates constituting the stator core of the present invention are arranged for the blanking from a steel plate material.

FIG. 4 is a plane view showing a state where the core piece steel plates constituting the stator core of the present invention are arranged for the blanking from a steel plate material.

Referring to FIG. 4, the core piece yoke 21 of the first core piece steel plate 20 is placed in parallel to the core piece yoke 21' of the second core piece steel plate 20', and the core piece teeth 22 of the first core piece steel plate 20 are placed between the core piece slots 23' of the second core piece steel plate 20'. Further, the core piece teeth 22' of the second core piece steel plate 20' are placed between the core piece slots 23 of the first core piece steel plate 20, and in this state, the first and second core piece steel plates 20 and 20' are blanked at the same time to minimize the loss of a steel plate material 2.

On the other hand, referring to FIGS. 3 and 4, when the core piece teeth 22 and 22' are the first and second core piece steel plates 20 and 20' are arranged in engagement with each other so as to minimize the consumption of the steel plate material 2, the gap g2 between the ends, that is, the pole portions 24 of the core piece teeth 22 of the first core piece steel plate 20 is larger than or equal to the width W of each core piece tooth 22' of the second core piece steel plate 20'. As mentioned above, desirably, the gap g2 between the pole portions 24 should be small. Accordingly, it is desirable that the gap g2 between the pole portions 24 should be equal to the width W of each core piece tooth 22' formed with a substantially small size. That is, the gaps g2 between the respective neighboring pole portions 24 are formed equal to the minimum width W of each core piece tooth 22'. In the drawings, the minimum width W of each core piece tooth 22' is formed on the position where the core piece yoke 21 is connected to each core piece tooth 22, thereby minimizing the consumption of the steel plate material 2 and also having possible small gaps between the pole portions 24.

In case of manufacturing the stator core of the motor by stacking the thin core piece steel plates and fixing them by means of caulking, the gaps between the steel plates become open while the motor is operating, thereby generating noise or vibration. So as to prevent the noise or vibration from occurring, thus, an adhesive, which has a strong bonding force and a low viscosity capable of entering the gaps between the steel plates is applied to the incised portions 25 for bending, and an explanation on the application of the adhesive will be given with reference to FIG. 5.

Figure 5:
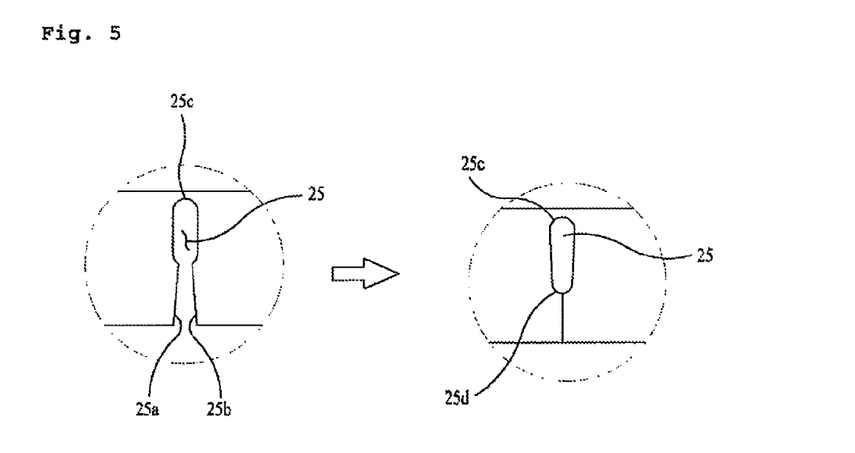
FIG. 5 is a conceptual view showing an incised portion for bending of the stator core of a motor for a washing machine according to the present invention.

FIG. 5 is a conceptual view showing an incised portion for bending of the stator core of a motor for a washing machine according to the present invention.

As shown in FIG. 5, the incised portion 25 for bending of the core piece steel plate 20 has the contacted portions 25a and 25b formed to face each other, and the contacted portions 25a and 25b are brought into contact with each other through the bending process. At this time, the incised portion 25 for bending has the shape of a closed loop as shown in the right side of FIG. 5. As shown, the upper side of the incised portion 25 for bending having the shape of the closed loop is denoted by a toe 25c, and the lower side thereof is denoted by a heel 25d.

So as to overcome the limitation in the bonding force between the core piece steel plates caused by means of caulking, according to the present invention, the adhesive is applied to the interior of the incised portion 25 for bending having the shape of the closed loop. That is, the adhesive is applied through a nozzle to the inside of the incised portion 25 for bending, thereby entering the gaps between the core piece steel plates to permit the core piece steel plates to be well bonded to each other.

Desirably, the adhesive is applied to the toe 25c or the heel 25d side. The adhesive has a given viscosity capable of entering the gaps, between the core piece steel plates and is naturally cured in the air, which is good in the economical respect.

Figure 6:
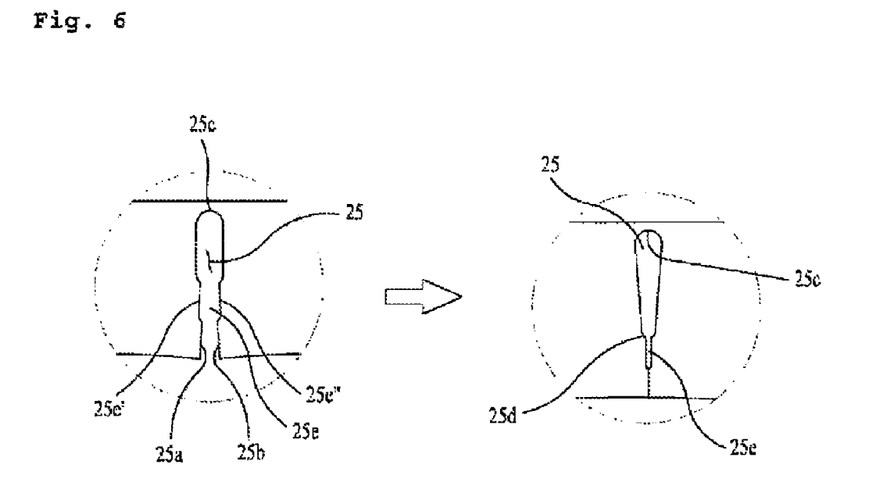
FIG. 6 is a conceptual view showing a heel slit formed on the incised portion for bending of the stator core of a motor for a washing machine according to the present invention.

FIG. 6 is a conceptual view showing a heel slit formed on the incised portion for bending of the stator core of a motor for a washing machine according to the present invention.

Referring to FIG. 6, the contacted portions 25a and 25b of the incised portion 25 for bending have slits 25e' and 25e" formed thereon to have respective grooves. If the contacted portions 25a and 25b are brought into contact with each other through the bending process, the slits 25e' and 25e" have a heel slit 25e extended from the heel 25d formed on the lower side of the incised portion 25 for bending having the shape of the closed loop. The heel slit 25e is formed to allow the adhesive to be moved more gently, and the width of the heel slit 25e is determined appropriately in accordance with the viscosity or surface tension of the adhesive.

Figure 7:
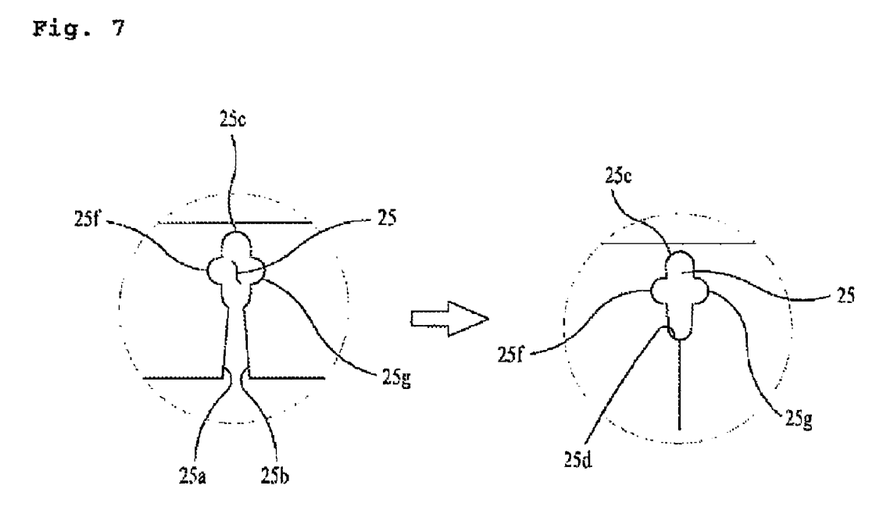
FIG. 7 is a conceptual view showing wings formed on the incised portion for bending of the stator core of a motor for a washing machine according to the present invention.

FIG. 7 is a conceptual view showing wings formed on the incised portion for bending of the stator core of a motor for a washing machine according to the present invention.

Referring to FIG. 7, the incised portion 25 for bending has wings 25f and 25g formed on both curved portions to have the similar shape to the toe 25c or the heel 25d. Both of the wings 25f and 25g are not necessarily formed, but if necessary, only one of them may be formed. If the adhesive is applied to the wings 25f and 25g, it is applied along their inner sides, thereby improving the bonding force between the core piece steel plates.

Figure 8:
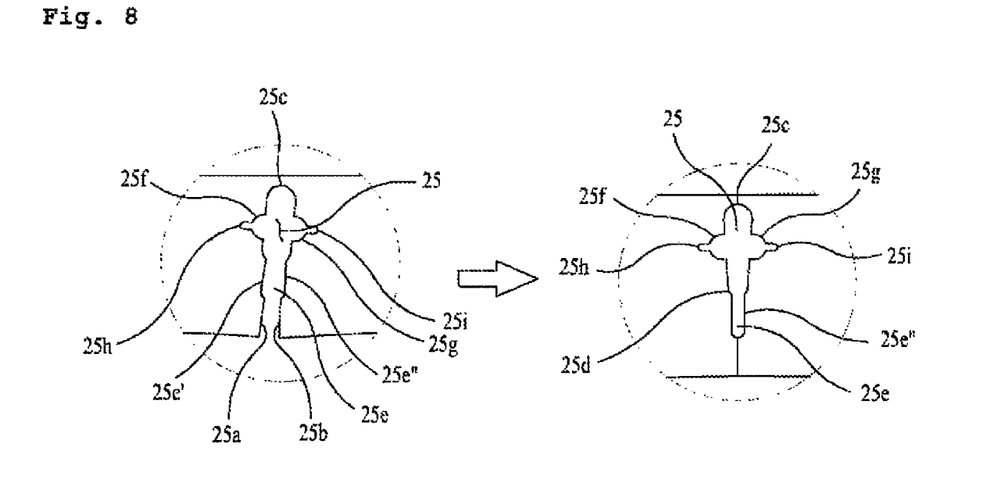
FIG. 8 is a conceptual view showing wing slits formed on the incised portion for bending of the stator core of a motor for a washing machine according to the present invention.

FIG. 8 is a conceptual view showing wing slits formed on the incised portion for bending of the stator core of a motor for a washing machine according to the present invention.

As shown in FIG. 8, the wings 25f and 25g formed on the incised portion 25 for bending have the respective wing slits 25h and 25i, thereby permitting the adhesive to be moved more gently.

The stator core 1 of the motor according to the present invention having the above-mentioned structure is made through the following steps.

Figure 9:
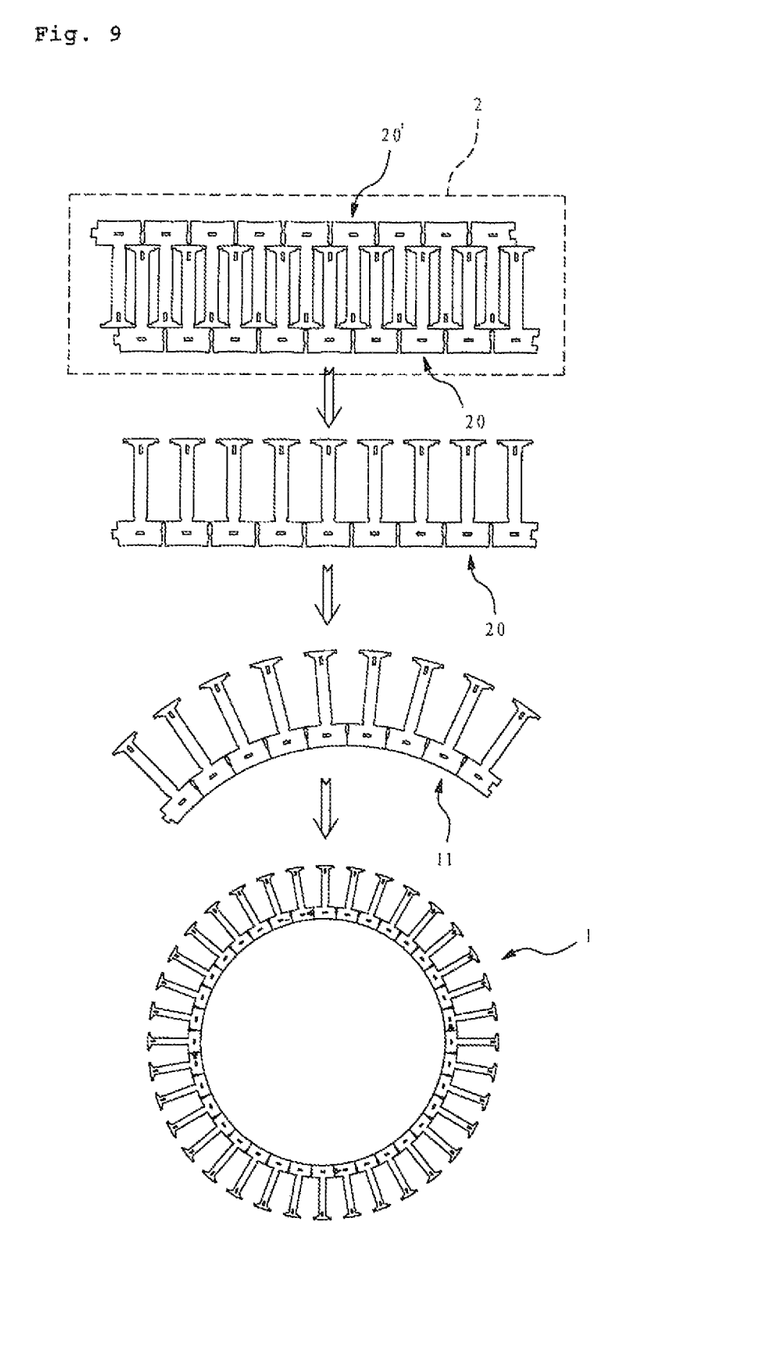
FIG. 9 is a flowchart showing a process for manufacturing the stator core of a motor for a washing machine according to the present invention.

FIG. 9 is a flowchart showing a process for manufacturing the stator core of a motor for a washing machine according to the present invention.

Referring to FIG. 9, a method for manufacturing the stator core of a motor according to the present invention includes the steps of: blanking from the steel plate material 2 the core piece steel plates 20 each having the core piece yoke 21 formed in the shape of a linear band, the plurality of core piece teeth 22 protruded from one side of the core piece yoke 21 in a width direction and arranged at predetermined intervals in the longitudinal direction of the core piece yoke 21 through the formation of slots 23 between the neighboring core piece teeth 22, and a coupling groove 26a and a coupling protrusion 26b formed on both side core piece yoke ends in the length directions of the core piece yokes 21 in such a manner as to be engaged with the coupling protrusion and coupling groove of the adjacent core piece yokes thereto; stacking the blanked core piece steel plates on top of each other; bending the core piece steel plates in such a manner that the core piece teeth 22 are disposed outward in the radial direction and the core piece yoke has the same curvature as the yoke of the stator core in the state where the core piece steel plates are stacked on top of each other, thereby forming core pieces; and connecting the core pieces to an annular shape, performing plastic deformation and caulking on the connected portions of the core pieces.

According to the present invention, desirably, the step of blanking the core piece steel plates is carried out in a state where the core piece teeth of one core piece steel plate are located into the core piece slots of the other core piece steel plate.

After performing caulking, the method further includes the step of applying an adhesive to the incised portions 25 for bending. The adhesive is sprayed through a nozzle positioned at the inside of each incised portion 25 for bending. The application of the adhesive enables the bonding force between the core piece steel plates to be more increased. Desirably, the adhesive is applied through the nozzle positioned on the toe 25c, the heel 25d or the wings 25f and 25g of each incised portion 25 for bending.

As described above, the stator core of a motor according to the present invention can prevent the unnecessary consumption of the material thereof, can be easily manufactured, can minimize the distance of the slot acting as a cause of cogging, and can prevent the core piece steel plates from being open relative to each other to keep noise and vibration from being generated during the operation of the motor.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A stator core of a motor for a washing machine, the stator core having a yoke formed in the shape of an annular band having a given curvature and a plurality of teeth protruded outward from the outer periphery of the yoke in the radial direction of the yoke and arranged at predetermined intervals in the circumferential direction of the yoke through the formation of slots between the neighboring teeth, wherein the stator core is formed by connecting a plurality of arc-shaped core pieces to each other, each core piece being formed by stacking core piece steel plates on top of each other, each core piece steel plate having a core piece yoke formed in the shape of a linear band, a plurality of core piece teeth protruded from one side of the core piece yoke in a width direction and arranged at predetermined intervals in the longitudinal direction of the core piece yoke by the formation of slots between the neighboring core piece teeth, and a coupling groove and a coupling protrusion formed on both side ends of the core piece yoke in the longitudinal direction of the core piece yoke in such a manner as to be engaged with the coupling protrusion and coupling groove of the neighboring core pieces, and by bending the stacked core piece steel plates in such a manner that the core piece teeth are disposed outward in the radial direction and the core piece yoke has the same curvature as the yoke of the stator core, the core piece yoke on each core piece steel plate having a plurality of incised portions for bending formed partially incised thereon between the respective neighboring core piece teeth on the opposite side to the side on which the core piece teeth are formed, each incised portion for bending being formed in such a manner that the incised faces are brought partially into contact with each other in the state where the respective core pieces are bent to have the curvature of the yoke of the stator core, wherein each incised portion forms an opening and a slit extended from the opening when the respective core pieces are bent to have the curvature of the yoke of the stator core, wherein the slit has a width narrower than a width of the opening and is extended from an end of the opening toward an inside of the yoke in the radial direction of the yoke when viewed from a top of the stator core, wherein said each incised portion includes wing slits each extended from a side of the opening in a widthwise direction so that each incised portion has a cross shape, wherein an adhesive is applied to insides of the incised portions each having a closed loop shape, wherein the adhesive is applied to an interior of the opening and insides of the wing slits.

2. The stator core according to claim 1, wherein the core piece teeth of the core piece steel plates have pole portions formed on the ends thereof, each pole portion being protrudedly extended to a given length toward both sides of each tooth in the width directions of the core piece teeth.

3. The stator core according to claim 1, wherein each of gaps between the respective neighboring pole portions is formed equal to a width of each core piece tooth.

4. A method for manufacturing a stator core of a motor, comprising the steps of:

blanking from a steel plate material core piece steel plates each having a core piece yoke formed in the shape of a linear band, a plurality of core piece teeth protruded from one side of the core piece yoke in a width direction and arranged at predetermined intervals in the longitudinal direction of the core piece yoke through the formation of slots between the neighboring core piece teeth, and a coupling groove and a coupling protrusion formed on both side core piece yoke ends in the longitudinal direction of the core piece yoke in such a manner as to be engaged with the coupling protrusion and coupling groove of the neighboring core piece yokes;

stacking the blanked core piece steel plates on top of each other;

bending the core piece steel plates in such a manner that the core piece teeth are disposed outward in the radial direction and the core piece yoke has the same curvature as the yoke of the stator core in the state where the core piece steel plates are stacked on top of each other, thereby forming core pieces;

connecting the core pieces to an annular shape and performing plastic deformation and caulking on the connected portions of the core pieces; and applying an adhesive to insides of incised portions each having a closed loop shape for bending formed on the core piece yoke between the respective neighboring core piece teeth on the opposite side to the side on which the core piece teeth are formed, wherein each incised portion forms an opening and a slit extended from the opening when the respective core pieces are bent to have the curvature of the yoke of the stator core, wherein the slit has a width narrower than a width of the opening and is extended from an end of the opening toward an inside of the yoke in the radial direction of the yoke when viewed from a top of the stator core, wherein said each incised portion includes wing slits each extended from a side of the opening in a widthwise direction so that each incised portion has a cross shape, wherein the adhesive is applied to an interior of the opening and insides of the wing slits.

5. The method according to claim 4, wherein the step of blanking the core piece steel plates is carried out in a state where the core piece teeth of one core piece steel plate are located into the core piece slots of the other core piece steel plate.

* * * * *